United States Patent [19]

Olashaw

[11] 4,298,771
[45] Nov. 3, 1981

[54] BOLTED/WELDED JOINT AND METHOD OF PERFECTING SAME

[75] Inventor: William F. Olashaw, Plainville, Conn.

[73] Assignee: General Electric Company, New York, N.Y.

[21] Appl. No.: 150,856

[22] Filed: May 19, 1980

[51] Int. Cl.³ .............................................. H02G 5/00
[52] U.S. Cl. ................................. 174/71 B; 29/860;
    29/868; 174/94 R; 228/138; 228/140; 361/355;
    361/361; 403/170; 403/271; 403/346; 403/387
[58] Field of Search .................. 174/71 B, 94 R, 70 B,
    174/88 B; 361/355, 361, 341, 342; 219/106;
    228/138, 140, 189; 403/170, 271, 346, 387;
    29/860, 868, 872, 873

[56] References Cited

U.S. PATENT DOCUMENTS

| | | | |
|---|---|---|---|
| 4,099,220 | 7/1978 | Kovatch et al. | 361/342 X |
| 4,121,276 | 10/1978 | Kovatch et al. | 174/71 B X |
| 4,136,374 | 1/1979 | Rosey et al. | 361/361 X |
| 4,176,243 | 11/1979 | Kovatch et al. | 361/342 X |
| 4,181,396 | 1/1980 | Olashaw | 339/263 R |

*Primary Examiner*—Gene Z. Rubinson
*Assistant Examiner*—David A. Tone
*Attorney, Agent, or Firm*—Richard A. Menelly; Walter C. Bernkopf; Philip L. Schlamp

[57] ABSTRACT

In an electrical switchboard, the body of an aluminum connector is welded to a riser bus. Bolts clamp a horizontal busbar in electrical connection with the connector body and, at the same time, fixture the horizontal busbar with a projection of the connector body protruding through an opening in the horizontal busbar. The projection is then welded to the horizontal busbar along the edges of the opening therein to create a bolted/welded joint electrically connecting the horizontal busbar to the riser bus. The projection is of sufficient height to accommodate plural coextensive horizontal busbars of a multiple bar bus run, common, bolted/welded electrical connection with the riser bus.

15 Claims, 3 Drawing Figures

4,298,771

BOLTED/WELDED JOINT AND METHOD OF PERFECTING SAME

BACKGROUND OF THE INVENTION

The present invention relates to bus joints, and particularly to electrical joints between aluminum busbars in electrical switchboards.

The most reliable electrical joint between aluminum current carrying members, such as busbars, is a welded joint. Unfortunately, welded joints are more difficult to perfect than, for example, bolted joints, particularly in terms of positioning and fixturing the busbars prior to welding and accessing the busbar interfaces where the weld is to be made.

It is accordingly an object of the present invention to provide an improved, welded bus joint for aluminum busbars.

Another object is to provide a welded bus joint of the above character which also incorporates the features of a bolted bus joint.

A further object is to provide a combination bolted/welded bus joint.

Yet another object is to provide a bolted/welded bus joint wherein the bolts making the bolted joint electrically interconnecting aluminum busbars serves to fixture the busbars while the welded joint is being made.

Still another object is to provide a bolted/welded bus joint of the above character which can be readily expanded, either in the factory or in the field, to accommodate additional busbars in bolted/welded electrical interconnection.

An additional object is to provide a method for perfecting bolted/welded bus joints of the above character.

Other objects of the invention will in part be obvious and in part appear hereinafter.

SUMMARY OF THE INVENTION

In accordance with the present invention there is provided an electrical bus joint having particular application in electrically joining aluminum horizontal and riser buses in a switchboard. The present invention is also directed to a method for perfecting such a bus joint. The bus joint of the present invention utilizes a connector fashioned of aluminum and having a body which is welded in electrical connection with a riser bus. At least one bolt is utilized to clamp the terminal portion of a horizontal busbar in electrical connection with the connector body, thereby perfecting a bolted joint therebetween. This bolted joint further serves to fixture the horizontal busbar with a projection, preferably integrally formed with the connector body, protruding through an opening in the horizontal busbar. A weld is then created to joint the projection to the horizontal busbar along the edges of the opening therein, thereby perfecting a welded joint there between. The bolt is left in place to thus achieve a bolted/welded bus joint.

As an additional feature of the invention, the body of the connector is of sufficient size to accommodate the terminal portions of two horizontal busbars arranged end to end. Bolts clamp the busbar terminal portions in electrical connection with the connector body to fixture the horizontal busbars with preferably a single elongated connector body projection protruding through aligned slots in the horizontal busbars extending longitudinally away from their confronting terminations. A weld is then created to join the projection to the horizontal busbars along the edges of the slots therein. As will be seen, the bolted/welded joints electrically connecting the two horizontal busbars with the riser bus need not be made at the same time or place, i.e., one may be made in the factory and the other in the field.

Still another feature of the invention resides in providing a connector body projection of sufficient height to accommodate expansion of the bolted/welded joint of the present invention for multiple bar horizontal bus runs. Thus, a bolted/welded joint for a first horizontal busbar of a multiple bar run is perfected in the above generally described manner. The bolt or bolts are then removed from this joint and a second horizontal busbar is overlapped with the first with intervening aluminum spacer. The bolts are then replaced to clamp the two busbars and spacer all in electrical connection with the connector body in bolted joint fashion. The bolts then also serve to fixture the second horizontal busbar with the projection protruding through an opening therein, whereupon a weld is created to join the projection to the second horizontal busbar along the edges of the opening therein. Additional horizontal busbars may be added in the same manner, either at the factory or in the field. Once the welded joint for the last busbar of a multiple bar horizontal bus run has been made, the joint-/fixturing bolts are left in place to complete the bolted/-welded bus joint with the riser bus.

The invention accordingly comprises the features of construction, arrangement of parts, and method steps for creating same, all of which will be exemplified in the description hereinafter set forth, and the scope of the invention will be indicated in the claims.

For a better understanding of the nature and objects of the invention, reference should be had to the following detailed description taken in conjunction with the accompanying drawings in which:

DESCRIPTION OF DRAWINGS

Corresponding reference numerals refer to like parts throughout the several views of the drawing.

DETAILED DESCRIPTION

Figure 1:
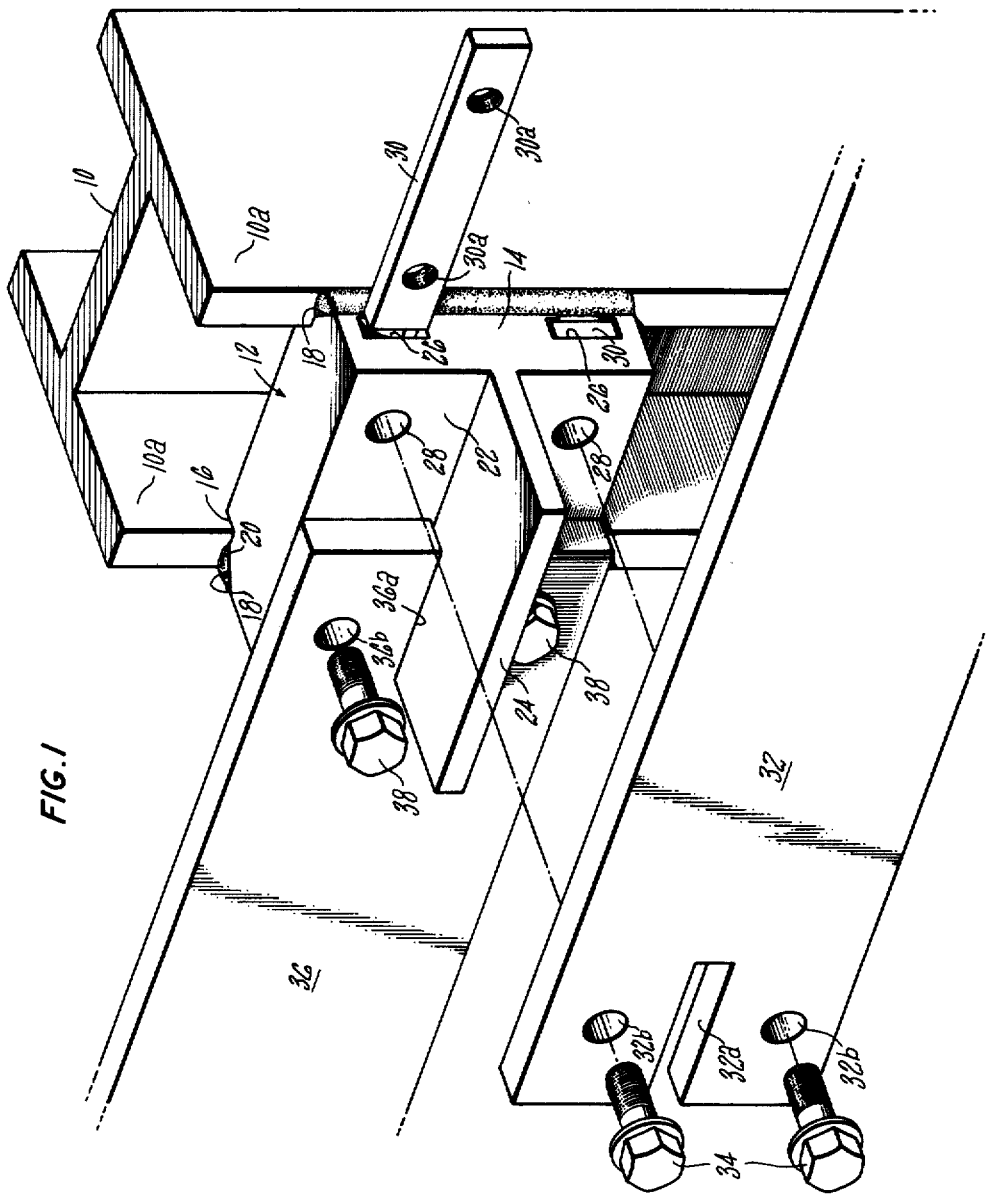
FIG. 1 is a perspective, assembly view of a bolted/-welded bus joint created in accordance with the present invention.

Referring to FIG. 1, an aluminum busbar 10, which may be a riser or vertical bus in an electrical switchboard, is illustrated as having an H-shaped cross-section. An electrical connector generally indicated at 12 and also formed of aluminum, is provided with a generally cubical body 14 whose rearward vertical edges are notched, as indicated at 16, to accommodate seating of the connector body against the opposed, front corners of the riser bus flanges 10a. Outwardly from notches 16, the connector body 14 is chamfered, as indicated at 18, to create vertically extending grooves into which weld fillets 20 are laid by a conventional arc welder to join connector body 14 in electrical connection with the riser bus.

Projecting from the front surface 22 of the connector body is a narrow, longitudinally elongated rib or flange 24. Preferably, connector 12 is an extrusion such that flange 24 is created as an integral projection or extension of body 14. By extruding connector 12, it becomes convenient to also create a pair of parallel, longitudinally extending, T-shaped slots 26 (FIG. 2) in the rear face of the connector body. Holes 28 are bored through the connector body to intersect these T-shaped slots, into which are then inserted steel plates 30 having tapped holes 30a located to line up with holes 28. As will be appreciated, in lieu of slots 26 and plates 30, holes 28 may be tapped.

Figure 2:
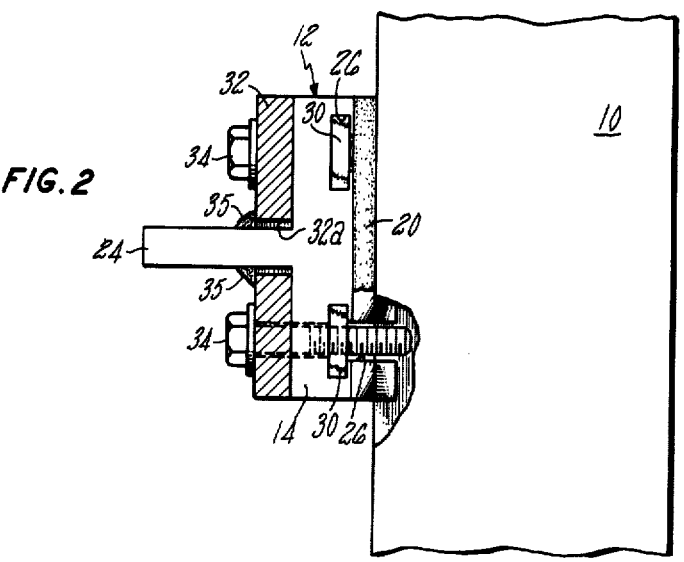
FIG. 2 is a side elevational view of the bus joint of FIG. 1.

An aluminum busbar 32 has its terminal portion preformed with an open-ended longitudinal extending slot 32a, preferably aligned with the busbar longitudinal centerline. A pair of bolt holes 32b are punched in the busbar terminal portion in straddling relation with slot 32a. The terminal portion of horizontal busbar 32 is positioned against front surface 22 of connector body 14 with flange 24 projecting through slot 32a and bolt holes 32b aligned with holes 28. Bolts 34 are then inserted through these aligned holes and threaded through tapped holes 30a in nut plate 30, pursuant to clamping the termination of busbar 32 into electrical contacting engagement with connector 12. It is thus seen that a bolted joint is thus achieved electrically connecting horizontal busbar 32 with riser bus 10. This bolted joint also serves to fixture the horizontal busbar preparatory to its being joined to flange 24 by a weld fillet 36 laid along the edges of slot 32a, as seen in FIG. 2, whereupon a welded joint is perfected between busbar 32 and connector 12. In application, bolts 34 are preferably left in place to achieve a bolted/welded joint electrically connecting the horizontal busbar to riser bus 10.

It is noted that since the bolted/welded joint for horizontal busbar 32 only occupies half of connector 12, connector space is available to accommodate a bolted/welded joint for another horizontal busbar 36 of a horizontal bus run extending beyond riser bus 10. Thus the terminal portion of busbar 36 is preformed with a slot 36a and bolt holes 36b in the same fashion as busbar 32. Bolts 38, inserted through bolt holes 36b and holes 28 in connector body 14, are threaded through tapped holes 30a in nutplate 30 to make the bolted joint between busbar 36 and connector 12, as well as fixture this horizontal busbar preparatory to perfecting a welded joint with flange 24 along the edges of slot 36a. Again bolts 38 are preferably left in place, thereby achieving another bolted/welded joint electrically connecting horizontal busbar 32, horizontal busbar 36 and riser bus 10 all in common. It will be appreciated that the separate bolted/welded joints for horizontal busbars 32 and 36 need not be made at the same time or place. That is, for example, the bolted/welded joint for busbar 32 may be made in the factory, and the bolted/welded joint for busbar 36 may be made subsequently in the field as is necessitated when adjacent switchboard vertical sections are transported as separate, so-called "shipping splits".

Figure 3:
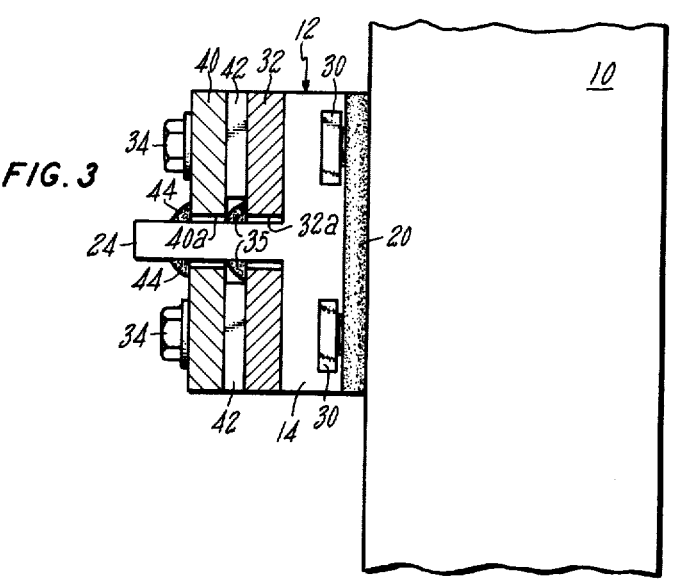
FIG. 3 is a side elevational view of the bus joint of FIG. 1 expanded to accommodate a double bar horizontal bus run.

As an additional feature of the present invention, the height of flange 24 relative to connector body 14 is sufficiently elevated to accommodate bolted/welded joints for multiple bar horizontal bus runs, as seen in FIG. 3. Thus, once the bolted/welded joint for horizontal busbar 32 has been made, bolts 34 are removed, and a second, identically constructed horizontal busbar 40 is positioned in overlapping relation to busbar 32 with flange 24 protruding through its termination slot 40a. Preferably aluminum spacers 42 are sandwiched between the terminal portions of these busbars to avoid interference of weld fillet 36 with busbar 40. Bolts 34 are then re-installed to clamp the terminal portions of these horizontal busbars and intervening spacers 42 in electrical interconnection in bolted joint fashion. Coincidentally, horizontal busbar 40 is fixtured preparatory to laying weld fillet 44 along the edges of slot 40a, thereby creating a welded joint between this busbar and flange 24. Again the bolts are preferably left in place to create a bolted/welded joint connecting horizontal busbars 32, 40 and riser bus 10 in common electrical connection. Of course, the height of flange 24 may be made even greater to accommodate bolted/welded joints for additional horizontal busbars of a three, four, etc., bar horizontal bus runs. Obviously, the bus joint of the present invention accommodates multiple bar horizontal bus runs extending beyond riser bus 10, such as to an adjacent switchboard vertical section.

It will be appreciated that flange 24 may be constituted by separate projections elevated from the connector front surface at central locations on the left and right halves of the connector body. In this situation, the slots or openings in the terminal portions of the horizontal busbars may be closed, i.e., removed from the end terminations thereof.

Moreover, while the present invention has been disclosed in the context of leaving the joint clamping bolts in place when the bus joint is put into service, I have found that the welded joint is of sufficient strength to essentially maintain the inter-surface contact pressure originally achieved by the bolts. Thus, the integrity and ampacity of the bus joint is not significantly degraded by the ultimate removal of the bolts. My invention in its broadest aspects does not therefore require that the bolts remain in place after the welded joint is made.

It will thus be seen that the objects set forth above, among those made apparent in the preceding description, are efficiently attained and, since certain changes may be made in the above construction or method steps without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. An electrical bus joint joining first and second aluminum busbars, said bus joint comprising, in combination:
   A. an aluminum connector including a body welded in electrical connection with the first busbar and a projection rising from a planar surface of said body;
   B. means forming an opening in a terminal portion of the second busbar;
   C. fixturing means incorporated in the terminal portion of the second busbar and said connector body accommodating clamping the second busbar terminal portion in electrical connection with said planar body surface with said projection protruding through said opening in the second busbar terminal portion; and
   D. a weld electrically joining said projection to the second busbar along the edge of said opening therein and maintaining the clamped electrical connection between the second busbar terminal portion and said planar body surface achieved by said fixturing means.

2. The electrical bus joint defined in claim 1 for joining a third busbar in aligned, end-to-end relation with the second busbar and further including means forming an opening in a terminal portion of the third busbar, fixturing means incorporated in said terminal portion of the third busbar and cooperating with said connector body fixturing means to accommodate clamping the third busbar terminal portion in electrical connection with said planar body surface and with said projection protruding said opening in the third busbar terminal portion, and an additional weld electrically joining said projection to the third busbar along the edge of said opening in the terminal portion thereof and maintaining the clamped electrical connection between the third busbar terminal portion and said planar body surface achieved by said fixturing means.

3. The electrical bus joint defined in claim 1 for joining a third busbar in overlapping relation with the second busbar, and further including means forming an opening in a terminal portion of the third busbar, fixturing means incorporated in the terminal portion of the third busbar and cooperating with said fixturing means incorporated in the second busbar terminal portion and said connector body to accommodate clamping the third busbar terminal portion in electrical connection with the second busbar terminal portion and with said projection protruding through said opening in the third busbar terminal portion, and a separate weld electrically joining said projection to the third busbar along the edge of said opening in the terminal portion thereof and maintaining the clamped electrical connection between the second and third busbar terminal portions achieved by said fixturing means.

4. The electrical bus joint defined in claim 3, which further includes an aluminum spacer clamped in surface-to-surface electrical contacting engagement between the terminal portions of the second and third busbars.

5. The electrical bus joint defined in claims 1, 2, 3 or 4, wherein said fixturing means accommodates bolts for exerting the electrical connection clamping force.

6. The electrical bus joint defined in claims 1, 2, 3 or 4, wherein said projection is integrally formed with said connector body in an extrusion process.

7. An electrical bus joint for utilization in an electrical switchboard to electrically interconnect an aluminum horizontal bus and an aluminum riser bus, said bus joint comprising, in combination:
  A. an aluminum connector including a body welded in electrical connecton with the riser bus and a projection rising from a planar surface of said body;
  B. at least one bolt clamping a terminal portion of the horizontal bus in electrical connection with said planar body surface and with said projection protruding through an opening in a terminal portion of the horizontal bus; and
  C. a weld joint said projection to the horizontal bus along the edge of said opening in the terminal portion thereof.

8. The bus joint defined in claim 7, wherein the horizontal bus includes two horizontal busbars aligned end-to-end, said bus joint including plural bolts clamping the adjacent terminal portions of the horizontal busbars in electrical connection with said planar body surface and with said projection protruding through aligned, longitudinally extending, open-ended slots formed in the busbar terminal portions, and welds joining said projection to the two horizontal busbars along the edges of said slots in their terminal portions.

9. The bus joint defined in claim 7, wherein the horizontal bus is a multiple bar bus run including first and second coextensive horizontal busbars, said bolt initially clamping the terminal portion of the first busbar in electrical connection with said planar body surface while said projection protruding through an opening in the terminal portion of the first busbar is welded thereto along the edge of said opening therein and then clamping the terminal portion of the second busbar in electrical connection with the terminal portion of the first busbar while said projection protruding through an opening in the terminal portion of the second busbar is welded thereto along the edge of said opening therein.

10. The bus joint defined in claims 7, 8 or 9, wherein said connector is formed as an extrusion with said projection configured as a narrow flange centrally located with respect to said planar body surface and elongated in the direction of the longitudinal centerline of the horizontal bus.

11. The bus joint defined in claims 7, 8 or 9 wherein said connector is formed as an extrusion with said projection configured as a narrow flange centrally located with respect to said planar body surface and elongated in the direction of the longitudinal centerline of the horizontal bus, said connector further including a pair of T-shaped slots extruded in said body, said slots being co-extensive with the longitudinal dimension of said body and offset to each side of said flange, clearance holes formed in said body and extending from said planar body surface into intersecting relation with said slots, and a plate slidingly received in each said slot and having tapped holes therein, said bolts extending through clearance holes in said horizontal bus terminal portions and said body clearance holes and threaded through said plate tapped holes to clamp the horizontal bus in electrical connection with said planar body surface.

12. A method of effecting a bus joint between first and second aluminum bus bars utilizing an aluminum connector having a body and a projection rising from a planar surface of said body, said method comprising the steps of:
  A. welding said connector body to the first busbar;
  B. applying bolts to clamp a terminal portion of the second busbar in electrical connection with said planar body surface and with said projection protruding through an opening formed in the second busbar terminal portion; and
  C. welding said projection to the second busbar along the edge of the opening in its terminal portion.

13. The method defined in claim 12 for effecting a bus joint between said busbars and a third alimunum busbar aligned end-to-end with said second busbar, said method further including the steps of applying bolts to clamp a terminal portion of the third busbar in electrical connection with said planar body surface and with said projection protruding through an opening formed in the third busbar terminal portion, and welding said projection to the third busbar along the edge of the opening in its terminal portion.

14. The method defined in claim 12 for effecting a bus joint between said first and second busbars and a third aluminum busbar arranged coextensively with said second busbar, said method comprising the further steps of removing the bolts clamping the terminal portion of the second bar in electrical connection with said planar body surface, positioning said third busbar in overlapping relation with said second busbar, reapplying the bolts to clamp the terminal portions of said second and third busbars in electrical interconnection and with said projection protruding through an opening formed in the third busbar terminal portion, and welding said projection to said third busbar along the edge of the opening in its terminal portion.

15. The method defined in claim 14 which further includes the step of positioning an aluminum spacer between the terminal portions of said second and third busbars prior to the reapplication of the bolts such that the bolts clamp the aluminum spacer in surface-to-surface electrical contacting engagement between the terminal portions of the second and third busbars.

* * * * *